United States Patent
Kurokawa et al.

(10) Patent No.: US 6,574,180 B2
(45) Date of Patent: Jun. 3, 2003

(54) MULTILAYER OPTICAL DISK AND METHOD OF INITIALIZING THE SAME

(75) Inventors: Kotaro Kurokawa, Kanagawa (JP); Koichi Yasuda, Tokyo (JP); Takeshi Yamasaki, Kanagawa (JP); Tomomi Yukumoto, Chiba (JP)

(73) Assignee: Sony Corporation, Tokyo (JP)

( * ) Notice: Subject to any disclaimer, the term of this patent is extended or adjusted under 35 U.S.C. 154(b) by 111 days.

(21) Appl. No.: 09/800,859

(22) Filed: Mar. 7, 2001

(65) Prior Publication Data

US 2002/0018428 A1 Feb. 14, 2002

(30) Foreign Application Priority Data

Mar. 7, 2000 (JP) ........................................ 2000-067209

(51) Int. Cl.[7] ................................................ G11B 3/74
(52) U.S. Cl. ........................................ 369/94; 369/283
(58) Field of Search ........................ 369/94, 272, 275.1, 369/275.2, 283, 284, 286, 288; 430/270.11

(56) References Cited

U.S. PATENT DOCUMENTS

| | | | |
|---|---|---|---|
| 5,684,778 A | | 11/1997 | Yamada et al. |
| 5,709,978 A | | 1/1998 | Hirotsune et al. |
| 5,768,221 A | | 6/1998 | Kasami et al. |
| 5,811,217 A | * | 9/1998 | Akahira et al. ............. 369/283 |
| 6,094,405 A | | 7/2000 | Ogawa |
| 6,149,999 A | * | 11/2000 | Suzuki et al. ............... 430/945 |
| 6,221,455 B1 | | 4/2001 | Yasuda et al. |
| 6,324,148 B1 | * | 11/2001 | Kaneko et al. ............... 369/94 |

FOREIGN PATENT DOCUMENTS

| | | |
|---|---|---|
| EP | 0957477 | 11/1999 |
| JP | 02049232 | 2/1990 |
| JP | 11144336 | 5/1999 |
| JP | 11195243 | 7/1999 |

* cited by examiner

Primary Examiner—Paul W. Huber
(74) Attorney, Agent, or Firm—Sonnenschein, Nath & Rosenthal

(57) ABSTRACT

Initialization nonuniformity due to interference of light which occurs during an initialization process is reduced without causing degradation in the characteristic of signals recorded/reproduced on/from respective recording layers. A multilayer optical disk comprising at least a first information recording layer and a second information recording layer formed, on a substrate, into a multilayer structure with an intermediate layer disposed therebetween is illuminated with initializing light from the side of the first information recording layer to initialize the first information recording layer formed of a phase-change material serving as a recording material. The illumination with the initializing light is performed such that the numerical aperture NA of an objective lens used for illumination with the illuminating light, the longitudinal length L of the beam size of the initializing light, the thickness D of the intermediate layer, and the ratio R1 of the amount of light striking the first information recording layer after passing through the first information recording layer and being reflected by the second information recording layer to the amount of light incident on the first information recording layer satisfy the following relation for a wavelength $\lambda i$ of the initializing light: $L \times R1 \leq 25[1-\exp(-0.0004 \times NA^4 \times D^2)]$.

10 Claims, 4 Drawing Sheets

MOVABLE IN A RADIAL DIRECTION OF THE DISK

FIG. 4

BEAM SHAPE IN CROSS SECTION TAKEN IN A RADIAL DIRECTION

BEAM SHAPE IN CROSS SECTION TAKEN ALONG A TRACK

FIG. 5

AREA ILLUMINATED, IN THE FIRST RECORDING LAYER, WITH LIGHT REFLECTED FROM THE SECOND RECORDING LAYER

FIG. 6

$\lambda i = 810nm$  $NA = 0.60$  $D = 30\mu m$
$L = 50\mu m$  $T1 = 70\%$

MULTILAYER OPTICAL DISK AND METHOD OF INITIALIZING THE SAME

RELATED APPLICATION DATA

The present application claims priority to Japanese Application No. P2000-067209 filed Mar. 7, 2000, which application is incorporated herein by reference to the extent permitted by law.

BACKGROUND OF THE INVENTION

1. Field of the Invention

The present invention relates to a multilayer optical disk having an information recording layer formed of a phase-change material serving as a recording material, and more particularly to a method of initializing such a multilayer optical disk.

2. Description of the Related Art

With advances in information and communication device technology, a need has arisen for an optical disk having a greater storage capacity.

In the art of two-layer digital versatile disks (DVDs), a storage capacity of 8.5 Gbytes has been achieved. However, the achieved capacity is not high enough to replace a home video recorder with an optical disk recorder or to record a high-vision broadcasting program.

In order to record a 4-hour broadcasting program according to the current NTSC standard using an optical disk instead of a conventional home video recorder, the optical disk has to have a storage capacity of 8 Gbytes or higher. In order to record a 3-hour high-vision broadcasting program, a storage capacity of 20 Gbytes or higher is required.

With future advances in the digital information and communication technology used in our societies, there will arisen a need for a recordable optical disk having an increasingly higher storage capacity.

As described above, although in read-only optical disks, a storage capacity of 8.5 Gbytes has already been achieved by means of a two-layer DVD disk, the maximum storage capacity is as small as 5.2 Gbytes in commercially available recordable optical disks. The commercially available recordable optical disks are of the single-layer type having only one information recording layer.

In recent years, significant efforts have been made to develop an optical disk including two recordable information layers, and some of them can be found in publications.

All proposed optical disks including two recordable layers are of the phase-change type using a phase-change recording material.

The phase-change optical disk is produced by depositing a reflecting metal film, a thin dielectric film, and a thin recording material film using a sputtering apparatus. Because the as-deposited thin recording material film is in an amorphous state, it is necessary to initializing the phase-change optical disk so as to convert it into a crystal state before recording information.

In general, the initialization of the phase-change type optical disk is performed using an apparatus (initializing apparatus) having functions similar to those of a drive device (drive) used to record/reproduce information on/from the optical disk, wherein light having a different wavelength from that used to record/reproduce information is used. The wavelength used in the initialization is generally in the infrared range, because laser diodes having high power capacity such as 1 W or 2 W are available in the infrared range.

The initialization using such an initializing apparatus is described in further detail below. First, a laser beam used for initialization is focused on an information recording layer through a condensing lens called an objective lens. The focused laser beam has a size of about 50 $\mu$m to 100 $\mu$m in a radial direction of the optical disk and about 1 $\mu$m in a direction along a track.

The temperature of the thin recording material film in the recording layer is raised near its melting point and then cooled at a rather slow rate so that the heated and cooled region of the thin recording material film is brought into a crystal state.

When a first recording layer of two information recording layers formed of a phase-change recording material is initialized using the above-described initializing apparatus, the initializing light focused upon the first recording layer passes through the first recording layer and further through a transparent layer (intermediate layer) disposed between the first recording layer and the other recording layer (second recording layer) and is then reflected by the second recording layer. The reflected light again passes through the intermediate layer and strikes the first recording layer. As a result, interfering occurs between the light which is focused upon the first recording layer and strikes it directly and the light striking the first recording layer after passing through the first recording layer and being reflected by the second recording layer.

The thickness of the intermediate layer has a variation on the order of several $\mu$m. The variation in the thickness of the intermediate layer causes a variation in the phase of two light rays interfering with each other on the first recording layer across the disk surface. Thus, the intensity of the laser beam striking the first recording layer varies across the disk surface. As a result, the initialization state of the first recording layer varies across the disk surface.

In the phase-change optical disk, the characteristic of a recorded/reproduced signal depends upon the initialization state, and a good characteristic of a recorded/reproduced signal cannot be obtained if there is a variation in the initialization state across the disk surface.

One possible method of reducing the initialization variation in the first recording layer due to the optical interlayer interference is to reduce the reflectance of the second recording layer for light with the wavelength used in the initialization. Another possible method is to reduce the transmittance of the first recording layer for light with the wavelength used in the initialization.

However, the multilayer structure of the information recording layer is generally designed such that optical thin films thereof are optimized so as to obtain a best characteristic of the recorded/reproduced information signal. If the reflectance or the transmittance for the wavelength used in initialization is taken into account in the design of the information recording layer, it becomes difficult to achieve the best characteristics of the information signals recorded/reproduced on/from the respective information recording layers. Although it would be desirable to reduce the transmittance of the first recording layer or reduce the reflectance of the second recording layer for the initialization wavelength without causing degradation in the characteristic of the information signals recorded/reproduced on/from the respective information recording layers, realization of such a reduction is very difficult.

In view of the above, it is an object of the present invention to provide a multilayer optical disk which can be initialized with a less initialization variation due to interference of light without degradation in the characteristic of signals recorded/reproduced on/from respective recording layers. It is another object of the present invention to provide a method of initializing such a multilayer optical disk.

SUMMARY OF THE INVENTION

According to an aspect of the present invention, to achieve the above objects, there is provided a multilayer optical disk comprising at least a first information recording layer and a second information recording layer formed in a multilayer structure with an intermediate layer disposed therebetween, the multilayer structure being formed on a substrate, wherein initialization of the first information recording layer is performed by illuminating the first information recording layer with initializing light applied from the side of the first information recording layer, the multilayer optical disk being characterized in that: the fist information recording layer is formed of a phase-change material serving as a recording material; and the numerical aperture NA of an objective lens used for illumination with the illuminating light, the longitudinal length L of the beam size of the initializing light, the thickness D of the intermediate layer, and the ratio R1 of the amount of light striking the first information recording layer after passing through the first information recording layer and being reflected by the second information recording layer to the amount of light incident on the first information recording layer satisfy the following relation for a wavelength $\lambda i$ of the initializing light:

$$L \times R1 \leq 25[1-\exp(-0.0004 \times NA^4 \times D^2)].$$

According to another aspect of the present invention, there is provided a multilayer optical disk comprising at least a first information recording layer and a second information recording layer formed in a multilayer structure with an intermediate layer disposed therebetween, the multilayer structure being formed on a substrate, wherein initialization of the second information recording layer is performed by illuminating the second information recording layer with initializing light applied from the side of the first information recording layer, the multilayer optical disk being characterized in that: the second information recording layer is formed of a phase-change material serving as a recording material; and the numerical aperture NA of an objective lens used for illumination with the illuminating light, the longitudinal length L of the beam size of the initializing light, the thickness D of the intermediate layer, and the ratio R2 of the amount of light striking the second information recording layer after being reflected by the second information recording layer and further reflected by the first information recording layer back to the second information recording layer to the amount of light incident on the second information recording layer satisfy the following relation for a wavelength $\lambda i$ of the initializing light:

$$L \times R2 \leq 25[1-\exp(-0.0004 \times NA^4 \times D^2)].$$

According to still another aspect of the present invention, there is provided a method of initializing a multilayer optical disk comprising at least a first information recording layer and a second information recording layer formed in a multilayer structure with an intermediate layer disposed therebetween, the multilayer structure being formed on a substrate, wherein initialization of the first information recording layer formed of a phase-change material serving as a recording material is performed by illuminating the first information recording layer with initializing light applied from the side of the first information recording layer, the method being characterized in that: the illumination with the initializing light is performed such that the numerical aperture NA of an objective lens used for illumination with the illuminating light, the longitudinal length L of the beam size of the initializing light, the thickness D of the intermediate layer, and the ratio R1 of the amount of light striking the first information recording layer after passing through the first information recording layer and being reflected by the second information recording layer to the amount of light incident on the first information recording layer satisfy the following relation for a wavelength $\lambda i$ of the initializing light:

$$L \times R1 \leq 25[1-\exp(-0.0004 \times NA^4 \times D^2)].$$

According to still another aspect of the present invention, there is provided a method of initializing a multilayer optical disk comprising at least a first information recording layer and a second information recording layer formed in a multilayer structure with an intermediate layer disposed therebetween, the multilayer structure being formed on a substrate, wherein initialization of the second information recording layer formed of a phase-change material serving as a recording material is performed by illuminating the second information recording layer with initializing light applied from the side of the first information recording layer, the method being characterized in that: the illumination with the initializing light is performed such that the numerical aperture NA of an objective lens used for illumination with the illuminating light, the longitudinal length L of the beam size of the initializing light, the thickness D of the intermediate layer, and the ratio R2 of the amount of light striking the second information recording layer after being reflected by the second information recording layer and further reflected by the first information recording layer back to the second information recording layer to the amount of light incident on the second information recording layer satisfy the following relation for a wavelength $\lambda i$ of the initializing light:

$$L \times R2 \leq 25[1-\exp(-0.0004 \times NA^4 \times D^2)].$$

When the information recording layers of the multilayer optical disk is subjected to processing called initialization using laser light (with a wavelength of $\lambda i$), the interference which occurs on the first information recording layer between the incident initializing light and the reflected light is suppressed by minimizing the amount of laser light (with a wavelength of $\lambda i$) which strikes the first information recording layer after passing through the first information recording layer and further through the intermediate layer and then being reflected by the second information recording layer relative to the amount of laser light which is focused upon the first information recording layer and which directly strikes it, thereby reducing the variation in the intensity of light on the first information recording layer due to the interference of light and thus achieving uniform initialization over the entire information recording layer.

Similarly, the interference which occurs on the second information recording layer between the incident initializing light and the reflected light is suppressed by minimizing the amount of laser light (with a wavelength of $\lambda i$) which strikes the second information recording layer after being reflected by the second information recording layer and then passing through the intermediate layer and further being reflected by the first information recording layer and again passing through the intermediate layer relative to the amount of laser light which is focused upon the second information recording layer and which directly strikes it, thereby reducing the variation in the intensity of light on the second information recording layer due to the interference of light and thus achieving uniform initialization over the entire information recording layer.

One method of minimizing the amount of light with the initialization wavelength reflected by the second information recording layer is to form the intermediate layer between the first information recording layer and the second information recording layer so that the intermediate layer has a characteristic varying depending upon the wavelength of light.

More specifically, the intermediate layer is formed so as to have transmittance equal to or higher than 95% at the wavelength used for recording/reproducing information but have sufficiently low transmittance at the wavelength used for the initialization so that initialization is performed uniformly. That is, using the above technique, the variation in the intensity of light striking an information recording layer being initialized is suppressed within an allowable range depending upon the required characteristic of the recorded/reproduced information signal.

For example, the wavelength-dependent absorbance of the intermediate layer can be realized by mixing a dye material into the transparent intermediate material. Herein, the dye material preferably has absorbance at the initialization wavelength but has as low absorbance as possible at the wavelength used for the recording/reproducing of information.

DESCRIPTION OF THE PREFERRED EMBODIMENTS

A multilayer optical disk and an initialization method thereof according to the present invention are described in further detail below with reference to preferred embodiments in conjunction with drawings.

Figure 1:
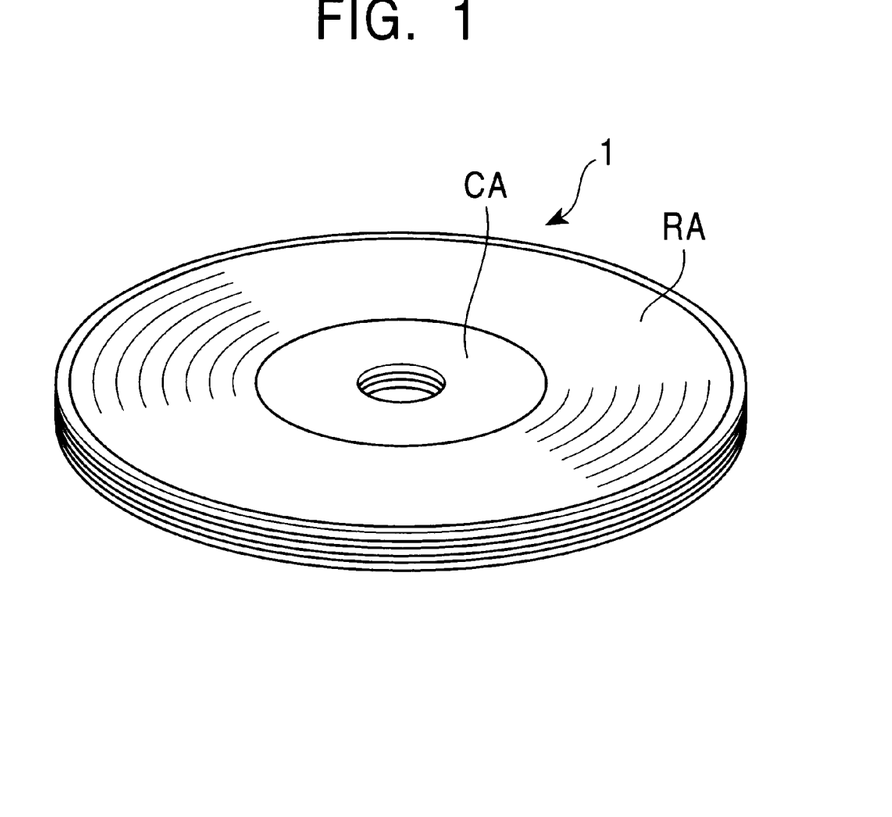
FIG. 1 is a perspective view schematically illustrating a multilayer optical disk.
Figure 2:
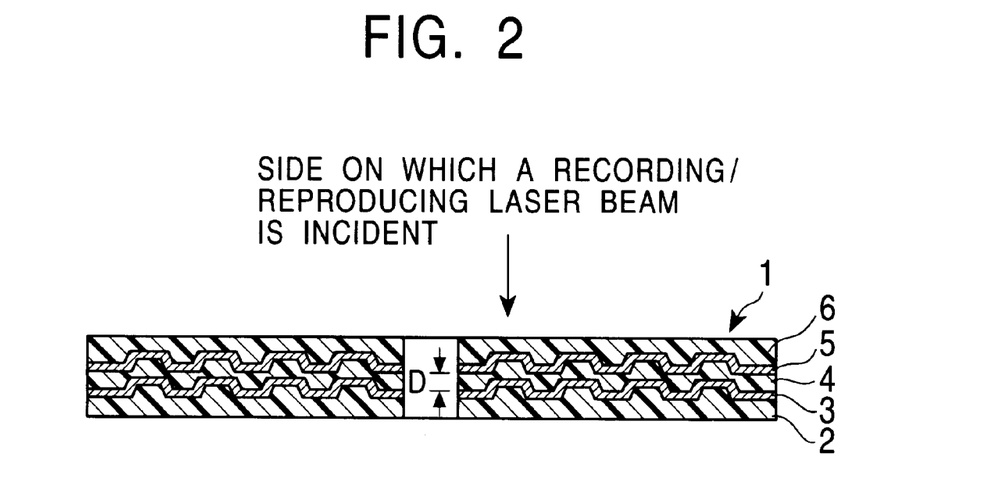
FIG. 2 is a cross-sectional view schematically illustrating an example of the layer structure of the multilayer optical disk.

FIG. 1 illustrates one example of a multilayer optical disk having a two-layer structure, and FIG. 2 illustrates the cross-sectional structure thereof.

In this multilayer optical disk 1, as shown in FIG. 1, an inner circumferential region serves as a clamping region CA, and an information recording/reproducing region RA is formed in the outside of the clamping region CA.

The multilayer optical disk 1 has a layer structure consisting of, as shown in FIG. 2, a second recording layer 3 disposed on a supporting substrate 2, an intermediate layer 4 with a thickness of 20 to 100 μm which is disposed on a side, opposite to the supporting substrate 2, of the second recording layer 3 and which is transparent to laser light with a wavelength used to record/reproduce a signal, and a first recording layer 5 disposed on a side, opposite to the second recording layer 3, of the intermediate layer 4. Furthermore, a light transmissive layer 6 with a thickness of 0.05 mm to 1.2 mm is disposed on the first recording layer 5, and a recording/reproducing laser beam is incident from the side of the light transmissive layer 6.

Herein, in this multilayer optical disk 1 with the above-described structure, by way of example, the first recording layer 5 formed of a phase-change material serving as a recording material is optimized for the initialization. Note that the disk structure of the multilayer optical disk to be initialized is not limited to that shown in FIG. 2. For example, the light transmissive layer 6 formed on the first recording layer 5 in the structure shown in FIG. 2 is not necessarily needed.

Figure 3:
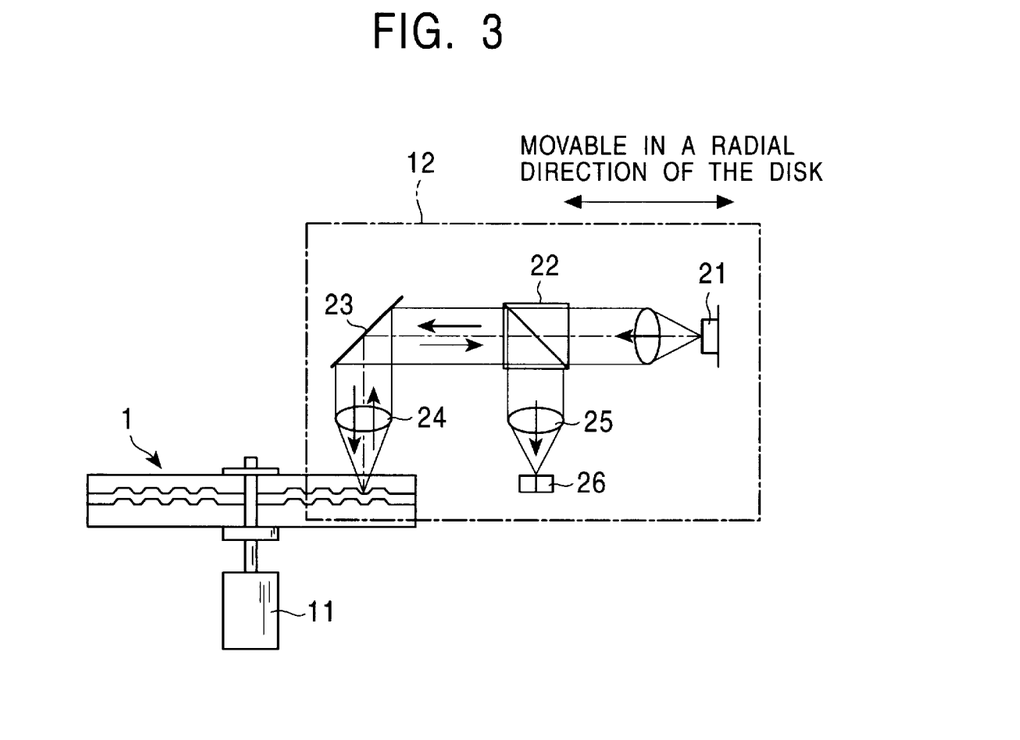
FIG. 3 is a schematic diagram illustrating an optical system of an initializing apparatus.

FIG. 3 illustrates the structure of an initializing apparatus used to initialize the optical disk.

This initializing apparatus is of an optical disk player type using a laser wavelength of 810 nm and having an objective lens with an NA of 0.60 for focusing a laser beam.

The multilayer optical disk 1 is rotated by a spindle motor 11 and the multilayer optical disk 1 being rotated is irradiated by an initializing light emitted from a moving optical system 12.

The moving optical system 12 includes a laser beam source 21, a beam splitter 22, a reflecting mirror 23, and an objective lens 24. Light reflected from the multilayer optical disk 1 is transmitted to a photo detector 26 via the beam splitter 22 and a condensing lens 25 thereby monitoring the reflected light.

Figure 4:
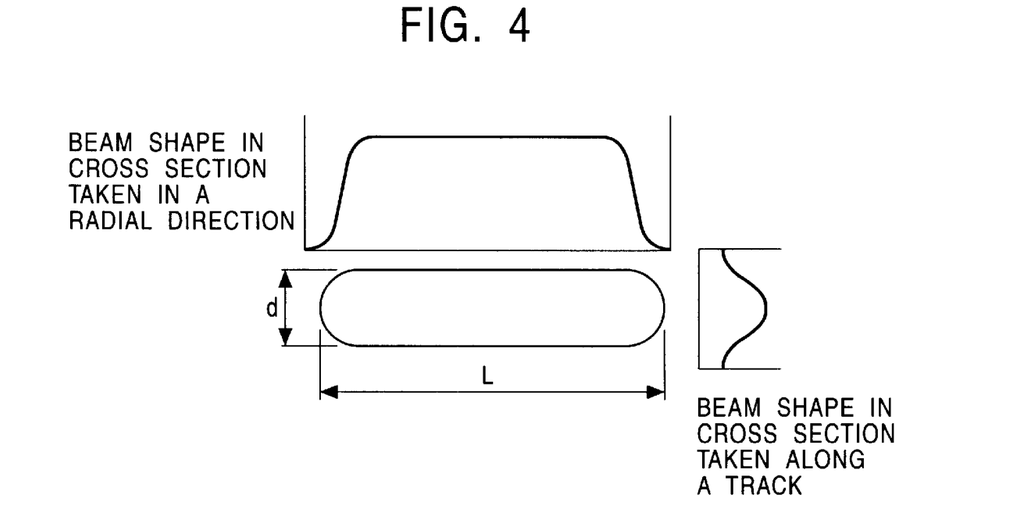
FIG. 4 is a schematic diagram illustrating the beam shape of initializing light.

The light is focused by the initializing apparatus, upon the first recording layer 5 of the multilayer optical disk 1, into a spot size of L≈50 μm in a radial direction of the disk and d≈1 μm in a direction along a track.

The process performed by the above-described initializing apparatus to initialize the multilayer optical disk 1 is described below. The multilayer optical disk 1 is rotated at a proper rotation speed, and the laser beam emitted from the initializing apparatus is focused, using a focus servo control technique, on a recording layer which is to be initialized. The focused laser beam moves a predetermined distance (for example 20 μm) in a radial direction every one revolution of the optical disk, thereby initializing the entire information recording/reproducing region RA of the optical disk.

First, the initialization of the first recording layer 5 of the multilayer optical disk 1 is described below for the case where intermediate layer 4 does not substantially have absorbance for both the wavelength used for initialization and the wavelength used for the recording/reproducing of information.

Figure 5:
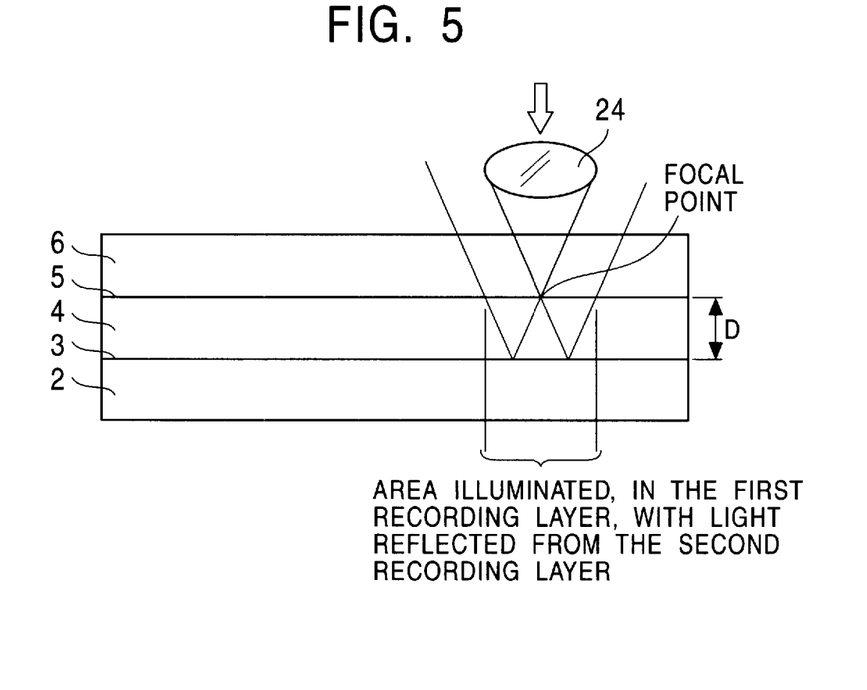
FIG. 5 is a schematic diagram illustrating an area illuminated, in a first recording layer, with light reflected from a second recording layer.

FIG. 5 illustrates a point upon which the initializing light is focused when the first recording layer 5 of the multilayer (two-layer) optical disk is initialized. Although not shown in FIG. 5, a guide groove is formed on each recording layer.

After being focused on the first recording layer, the initializing light passes through the first recording layer 5 and further through the intermediate layer 4 and is reflected by the second recording layer 3. The reflected light again passes through the intermediate layer 4 and strikes the first recording layer 5. As a result, the light directly striking the first recording layer 5 and the light reflected by the second recording layer 3 interferes with each other upon the first recording layer 5. The interference of light causes a variation in the intensity of the laser beam striking the first recording layer 5, which would not occur if the reflection from the second recording layer 3 were not present. The degree of the variation depends upon the thickness D of the intermediate layer 4.

The variation in the intensity of light striking the first recording layer 5 due to the interference of light occurs periodically with increasing thickness D of the intermediate layer 4. When the intermediate layer 4 has a refractive index Ni for the wavelength $\lambda i$ of the initializing light, the intensity of the light striking the first recording layer 5 varies with a period of $\lambda i/(2Ni)$ with increasing thickness D of the intermediate layer 4. In a practical system, $\lambda i \approx 0.81$ μm and Ni$\approx$1.53 and thus peaks or valleys of the intensity of light striking the first recording layer 5 periodically appear each time the thickness of D of the intermediate layer 4 varies by 0.26 μm. Because the thickness D of the intermediate layer 4 is as large as several ten μm, it is impossible to precisely control the thickness of the intermediate layer 4 within a variation of 0.02 μm. In practice, the intermediate layer 4 has a thickness variation of 1 μm or greater across the disk surface. Therefore, the degree of interference cannot be constant across the disk surface.

Figure 6:
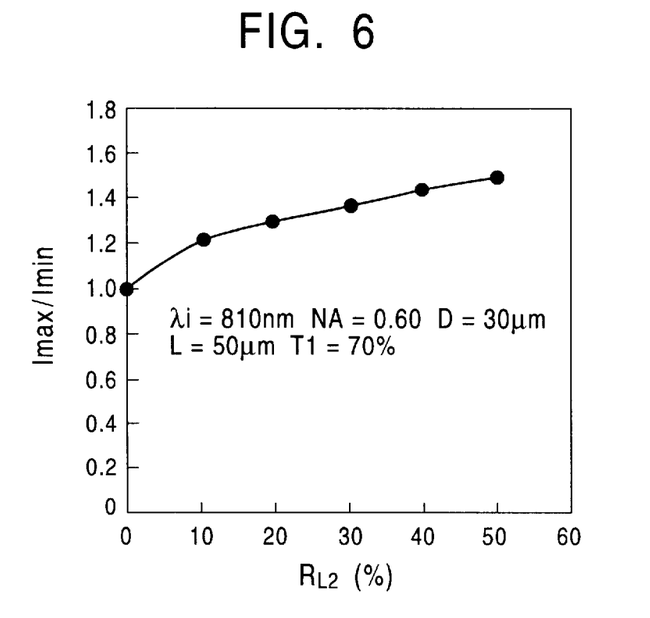
FIG. 6 is a graph showing the dependence of Imax/Imin upon $R_{L2}$.

In the initializing apparatus described above, when the thickness D of the intermediate layer 4 is equal to 30 μm and the optical transmittance T1 of the first recording layer 5 for the laser beam ($\lambda i$=810 nm) is 70%, the ratio (Imax/Imin) of the maximum intensity to the minimum intensity of light which occurs on the first recording layer 5 as a result of interference of light is plotted in FIG. 6 as a function of the reflectance $R_{L2}$ of the second recording layer 3 for the laser beam $\lambda i$.

It can be seen from FIG. 6 that $R_{L2}$ should be equal to or less that 4% to obtain the ratio Imax/Imin equal to or less than 1.1. Herein, the maximum allowable ratio Imax/Imin is determined to be 1.1, because a good characteristic of an information signal recorded/reproduced on/from the multilayer optical disk can be obtained if the variation in the initialization power is within the above range (initialization power margin: Imax/Imin$\leq$1.1).

The parameters of the multilayer optical disk having contributions to the variation in the intensity of light due to the interference of light include the optical transmittance T1 of the first recording layer 5 and the reflectance $R_{L2}$ of the second recording layer 3 for the wavelength $\lambda i$ of the initializing light, and the parameters of the initializing apparatus having contributions to the variation in the intensity of light include the wavelength $\lambda i$ of the initializing light, the NA of the objective lens, and the shape of the beam focused upon the information recording surface.

In order to meet the requirement of Imax/Imin$\leq$1.1, the constraints on $\lambda i$, NA, the longitudinal length L of the focused beam size, the transverse length d of the focused beam size, the thickness D of the intermediate layer 4 of the multilayer optical disk, and the ratio of the amount of light R(%) which again strikes the first recording layer 4 after being reflected by the second recording layer 3 to the amount of light incident upon the first recording layer 5 have been determined by calculation. The result is represented by a shaded area in FIG. 7. In the above calculation, the transverse length d of the beam size is determined by the wavelength $\lambda i$ and the NA as d=0.82$\times\lambda i$/NA, and R is determined by the transmittance T1 of the first recording layer 5 and the reflectance $R_{L2}$ of the second recording layer 3 as R=$R_{L2}\times$T1$\times$T1.

Figure 7:
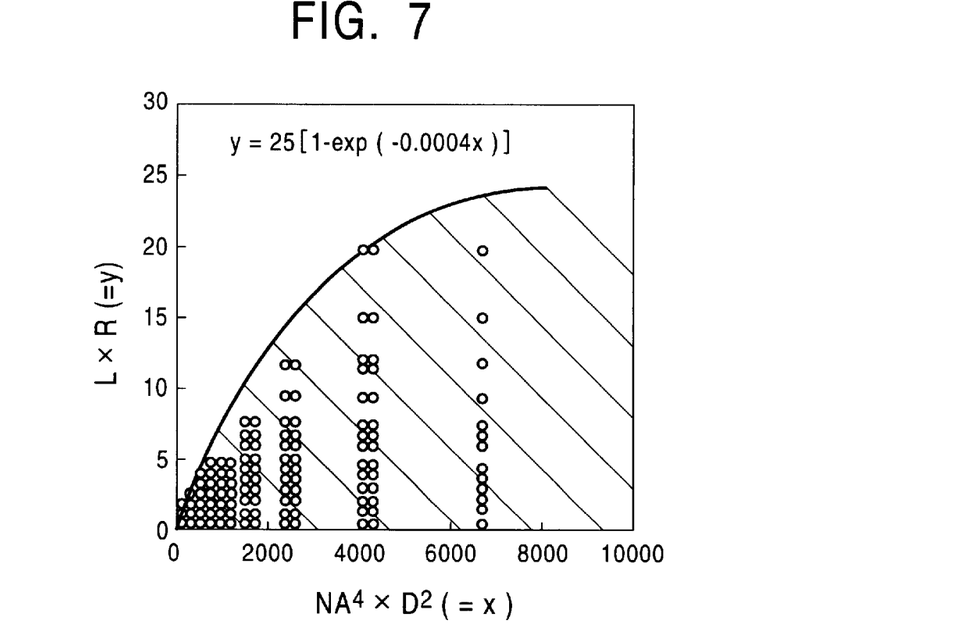
FIG. 7 is a graph showing the relationship between L×R (=y) and $NA^4 \times D^2$.

Uniform initialization of the information recording layer of the multilayer optical disk can be achieved by designing the multilayer optical disk such that the constraints represented by the shaded area shown in FIG. 7 are satisfied when the resultant multilayer optical disk is used in conjunction with a given initializing apparatus, or by designing the initializing apparatus depending upon a multilayer optical disk capable of being produced such that the constraints represented by the shaded area shown in FIG. 7 are satisfied when the initializing apparatus is used in conjunction with the multilayer optical disk.

It can be seen from FIG. 7 that a reduction in R results in increases in the allowable ranges of the beam width L and the thickness D of the intermediate layer 4. That is, the influence of the interference of light in the initialization process can be reduced by optimizing the specifications of the conventional initializing apparatus. In the design of the multilayer optical disk, it is desirable that the first recording layer 5 and the second recording layer 3 be both optimized for the wavelength of the recording/reproducing light so that the best characteristic is obtained for the information signal recorded/reproduced on/from the respective recording layers. However, it is very difficult to design the multilayer optical disk such that T1 and $R_{L2}$ for the initialization wavelength are reduced while maintaining the best characteristic of the recorded/reproduced information signal.

A solution obtained through efforts to optimize the multilayer optical disk is that T1=60% and $R_{L2}$=20% for $\lambda i$=810 nm. The initialization power variation ratio Imax/Imin on the first recording layer 5 of such a multilayer optical disk under the conditions shown in Table 1 is about 1.3, which can cause nonuniformity to occur in initialization due to the interference of light. In order to reduce the initialization nonuniformity, the initializing apparatus should meet the requirements shown in Table 2. However, the requirements are not practical because the NA of the objective lens should be very large and the longitudinal length L of the beam size should be very small. However, there is a possibility that a further optimization of the multilayer optical disk can bring a solution which allows both T1 and $R_{L2}$ to have small enough values.

TABLE 1

Example 1 of the initialization light intensity variation ratio for given specifications of the initializing apparatus and the multilayer optical disk

| Specifications of the initializing apparatus | |
|---|---|
| NA of the objective lens | 0.60 |
| Wavelength of the initializing light | 810 nm |
| Beam size in the longitudinal direction | 50 μm |
| Specifications of the multilayer optical disk | |
| Transmittance of the first recording layer (*) | 70% |
| Reflectance of the second recording layer (*) | 30% |
| Thickness of the intermediate layer | 30 μm |
| Variation ratio of the intensity of initializing light | 1.3 |

(*) Values for the wavelength of the initializing light

TABLE 2

Example 2 of the initialization light intensity variation
ratio for given specifications of the initializing apparatus
and the multilayer optical disk

| Specifications of the initializing apparatus | |
| --- | --- |
| NA of the objective lens | 0.80 |
| Wavelength of the initializing light | 810 nm |
| Beam size in the longitudinal direction | 20 μm |
| Specifications of the multilayer optical disk | |
| Transmittance of the first recording layer (*) | 70% |
| Reflectance of the second recording layer (*) | 10% |
| Thickness of the intermediate layer | 30 μm |
| Variation ratio of the intensity of initializing light | 1.05 |

(*) Values for the wavelength of the initializing light

Now a method of reducing the intensity variation due to the interference of light without having no constraints on the structure of the information recording layers and the structure of the initializing apparatus.

In this technique, the intermediate layer 4 is formed of a material having absorbance at the wavelength $\lambda i$ used for the initialization and having small absorbance at the wavelength used for the recording/reproducing of information so that the amount of initializing light reflected by the second recording layer 3 is reduced thereby reducing the initialization non-uniformity. The intermediate layer 4 may be formed of a single material or a mixture of a plurality of materials.

If the constraint that the optical transmittance Tm of the intermediate layer 4 be equal to 40% for the initialization wavelength is added to the conditions shown in Table 1, the calculated initialization power variation ratio Imax/Imin on the first recording layer 5 becomes about 1.1, and thus it becomes possible to perform initialization so that a good characteristic of a recorded/reproduced information signal can be obtained.

In the case where the intermediate layer 4 has no absorbance for the wavelength $\lambda i$, the allowable range of the optical transmittance Tm of the intermediate layer 4 for the initialization wavelength is given by $R=R_{L2} \times T1 \times T1$. In contrast, for the intermediate layer 4 having absorbance, the allowable range of the optical transmittance Tm of the intermediate layer 4 for the initialization wavelength is given by $R=Tm \times Tm \times R_{L2} \times T1 \times T1$. Tm should be selected so as to satisfy the constraints shown in FIG. 7 for R given above.

A method of imparting absorbance for the wavelength $\lambda i$ to the intermediate layer 4 is described below. Materials employable to form the intermediate layer 4 include transparent plastic such as an ultraviolet-cured resin and polycarbonate and an organic material such as a transparent adhesive material which is used in adhesive tapes. These materials are used to form two-layer DVD disks. These materials may also be employed herein to form the recordable multilayer optical disk. It is possible to easily mix a dye material into these materials during a production process. Therefore, it is possible to reduce Tm and R by mixing a dye having absorbance at the wavelength $\lambda i$ of the initializing light into the material of the intermediate layer 4.

However, if the dye material employed has also absorbance at the wavelength used for the recording/reproducing of information signals on/from the multilayer optical disk, the addition of the dye material can results in problems of a reduction in the level of a signal reproduced from the second recording layer 3 and a reduction in the sensitivity to the recording power. Therefore, it is desirable that the absorbance of the dye material be as small as possible for the wavelength $\lambda r$ used for the recording/reproducing of information.

More specifically, it is desirable that the reduction in the recording sensitivity and the reduction in the amount of reproducing light should be smaller than 90%. This can be met if the optical transmittance Tm($\lambda r$) of the intermediate layer 4 for the recording/reproducing light $\lambda r$ satisfies the following condition:

$$Tm(\lambda r) \geq 95\%$$

To satisfy the above condition, the extinction coefficient kr of the intermediate layer 4 including the dye material for the wavelength $\lambda r$ used for recording/reproducing information and the thickness D of the intermediate layer 4 should satisfy the following condition:

$$kr \times D/\lambda r \leq 0.008$$

Figure 8:
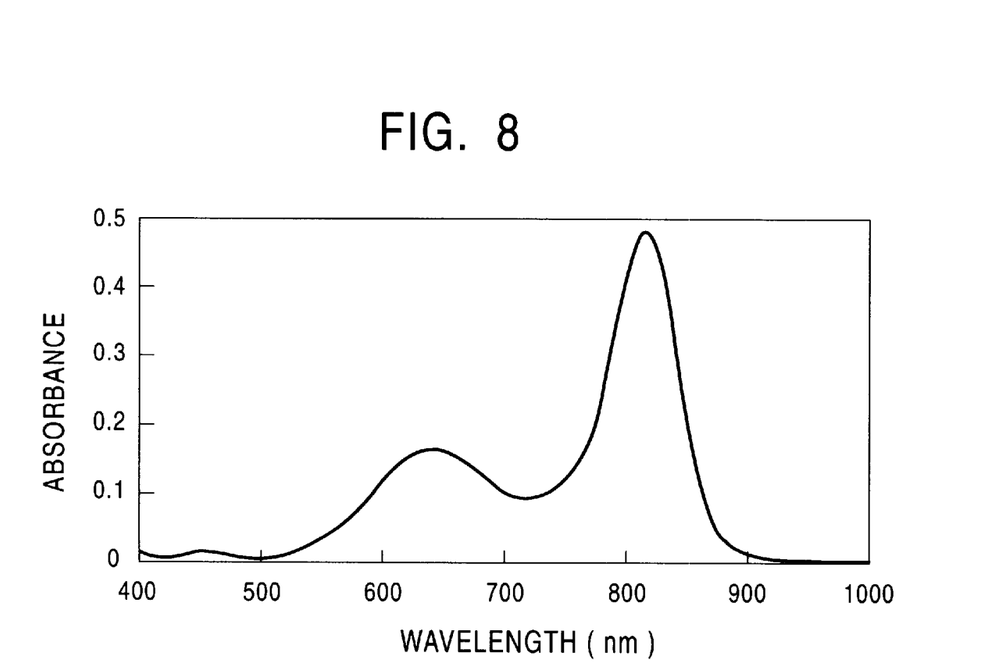
FIG. 8 is a graph showing an example of an absorption spectrum of a polymethine dye.

Specific examples of dye materials which are mixed into the intermediate layer and which have absorbance at the initialization wavelength $\lambda i$ but have small absorbance at the recording/reproducing wavelength $\lambda r$ include cyanine dyes and polymethine dyes having a peak absorbance at a wavelength near the wavelength of 810 nm of the laser beam employed in commercially available initializing apparatus. FIG. 8 illustrates an example of the absorption spectrum of a polymethine dye.

These types of dye materials have a narrow absorption band in optical absorption spectrum, and thus it is possible to select a dye material having substantially no absorbance near a wavelength $\lambda r=400$ nm used to record/reproduce information on/from the multilayer optical disk.

In the case where the polymethine dye whose absorption spectrum is shown in FIG. 8 is employed, the ratio of the absorbance for the recording/reproducing light ($\lambda r=400$ nm). to that for the initializing light ($\lambda i=810$ nm) is about 1:50. In the case where no dye is added, when the optical transmittance T1 of the first recording layer 5 for the initializing light with the wavelength $\lambda i$ is 70% and the optical reflectance $R_{L2}$ of the second recording layer 3 is 30%, the reflection factor R becomes 15% and there is no loss at the wavelength used for the recording/reproducing of information. In contrast, in the case where the dye is added, if the round-trip transmittance of the intermediate layer for the wavelength $\lambda i$ of the initializing light is 7% (Tm×Tm), then R=1% and the round-trip transmittance of the intermediate layer for the wavelength of the recording/reproducing light becomes 95%.

Thus, it is possible to reduce R by mixing the above material or a similar material into the material of the transparent intermediate layer 4. The dye material is not limited to those having such an absorption spectrum as shown in FIG. 8, but any dye material which has absorption in the initializing wavelength range and which can be mixed in the intermediate layer 4.

Furthermore, the method of imparting the wavelength dependence to the intermediate layer 4 is not limited to mixing of a dye material. For example, the main material of the intermediate layer 4 may have absorbance at the wavelength $\lambda i$ but have no absorbance at the wavelength $\lambda r$.

The method described above makes it possible to initialize the first recording layer 5 without having an influence of interference of light.

As can be understood from the above description, the present invention provides great advantages. That is, the variation in the intensity of the initializing light focused upon the first recording layer is reduced by optimizing the wavelength λi of the laser beam used in the initializing apparatus, the NA representing the ability of the objective lens to focus light, the longitudinal length L of the beam size, the thickness D of the intermediate layer of the multilayer optical disk, the transmittance T1 of the first recording layer for the wavelength of the initializing light, and the reflectance $R_{L2}$ of the second recording layer itself for the wavelength λi of the initializing light, thereby making it possible to uniformly initialize the information recording layer of the multilayer optical disk.

Furthermore, a dye material having absorbance for the wavelength range used for initialization but having no absorbance in the wavelength range used for the recording/reproducing of information is mixed in the intermediate layer thereby reducing the variation in the intensity of the initializing light on the first recording layer without imposing a constraint on the design of the information recording layer in terms of the wavelength of the initializing light and thus making it possible to obtain a good characteristic in recorded/reproduced information signals.

What is claimed is:

1. A multilayer optical disk comprising at least a first information recording layer and a second information recording layer formed in a multilayer structure with an intermediate layer disposed therebetween, said multilayer structure being formed on a substrate, wherein initialization of said first information recording layer is performed by illuminating said first information recording layer with initializing light applied from the side of said first information recording layer, said multilayer optical disk being characterized in that:

said fist information recording layer is formed of a phase-change material serving as a recording material; and the numerical aperture NA of an objective lens used for illumination with said illuminating light, the longitudinal length L of the beam size of said initializing light, the thickness D of the intermediate layer, and the ratio R1 of the amount of light striking the first information recording layer after passing through the first information recording layer and being reflected by the second information recording layer to the amount of light incident on the first information recording layer satisfy the following relation for a wavelength λi of the initializing light:

$$L \times R1 \leq 25[1-\exp(-0.0004 \times NA^4 \times D^2)].$$

2. A multilayer optical disk according to claim 1, wherein a light-transmissive layer with a thickness of 0.005 mm to 1.2 mm is formed on said first information recording layer, and recording/reproducing light is applied from the side of said light-transmissive layer.

3. A multilayer optical disk according to claim 1, wherein said intermediate layer has the property of absorbing the initializing light with a wavelength of λi.

4. A multilayer optical disk according to claim 3, wherein said intermediate layer has an extinction coefficient kr satisfying the following condition for a recording/reproducing wavelength of λr:

$$kr \times D/\lambda r \leq 0.008.$$

5. A multilayer optical disk comprising at least a first information recording layer and a second information recording layer formed in a multilayer structure with an intermediate layer disposed therebetween, said multilayer structure being formed on a substrate, wherein initialization of said second information recording layer is performed by illuminating said second information recording layer with initializing light applied from the side of said first information recording layer, said multilayer optical disk being characterized in that:

said second information recording layer is formed of a phase-change material serving as a recording material; and the numerical aperture NA of an objective lens used for illumination with said illuminating light, the longitudinal length L of the beam size of said initializing light, the thickness D of the intermediate layer, and the ratio R2 of the amount of light striking the second information recording layer after being reflected by the second information recording layer and further reflected by the first information recording layer back to said second information recording layer to the amount of light incident on the second information recording layer satisfy the following relation for a wavelength λi of the initializing light:

$$L \times R2 \leq 25[1-\exp(-0.0004 \times NA^4 \times D^2)].$$

6. A multilayer optical disk according to claim 5, wherein a light-transmissive layer with a thickness of 0.005 mm to 1.2 mm is formed on said first information recording layer, and recording/reproducing light is applied from the side of said light-transmissive layer.

7. A multilayer optical disk according to claim 5, wherein said intermediate layer has the property of absorbing the initializing light with a wavelength of λi.

8. A multilayer optical disk according to claim 7, wherein said intermediate layer has an extinction coefficient kr satisfying the following condition for a recording/reproducing wavelength of λr:

$$kr \times D/\lambda r \leq 0.008.$$

9. A method of initializing a multilayer optical disk comprising at least a first information recording layer and a second information recording layer formed in a multilayer structure with an intermediate layer disposed therebetween, said multilayer structure being formed on a substrate, wherein initialization of the first information recording layer formed of a phase-change material serving as a recording material is performed by illuminating said first information recording layer with initializing light applied from the side of said first information recording layer, said method being characterized in that:

the illumination with the initializing light is performed such that the numerical aperture NA of an objective lens used for illumination with said illuminating light, the longitudinal length L of the beam size of said initializing light, the thickness D of the intermediate layer, and the ratio R1 of the amount of light striking the first information recording layer after passing through the first information recording layer and being reflected by the second information recording layer to the amount of light incident on the first information recording layer satisfy the following relation for a wavelength λi of the initializing light:

$$L \times R1 \leq 25[1-\exp(-0.0004 \times NA^4 \times D^2)].$$

10. A method of initializing a multilayer optical disk comprising at least a first information recording layer and a second information recording layer formed in a multilayer structure with an intermediate layer disposed therebetween, said multilayer structure being formed on a substrate, wherein initialization of the second information recording layer formed of a phase-change material serving as a recording material is performed by illuminating said second information recording layer with initializing light applied from the side of said first information recording layer, said method being characterized in that:

the illumination with the initializing light is performed such that the numerical aperture NA of an objective lens used for illumination with said illuminating light, the longitudinal length L of the beam size of said initializing light, the thickness D of the intermediate layer, and the ratio R2 of the amount of light striking the second information recording layer after being reflected by the second information recording layer and further reflected by the first information recording layer back to said second information recording layer to the amount of light incident on the second information recording layer satisfy the following relation for a wavelength $\lambda i$ of the initializing light:

$$L \times R2 \leq 25[1-\exp(-0.0004 \times NA^4 \times D^2)].$$

* * * * *